United States Patent [19]
Benner et al.

[11] Patent Number: 5,931,915
[45] Date of Patent: Aug. 3, 1999

[54] METHOD FOR PROCESSING EARLY ARRIVAL MESSAGES WITHIN A MULTINODE ASYNCHRONOUS DATA COMMUNICATIONS SYSTEM

[75] Inventors: Alan F. Benner, Poughkeepsie; Michael Grassi, Shokan, both of N.Y.

[73] Assignee: International Business Machines Corporation, Armonk, N.Y.

[21] Appl. No.: 08/856,619

[22] Filed: May 13, 1997

[51] Int. Cl.⁶ .................................................. G06F 15/163
[52] U.S. Cl. ......................... 709/232; 709/237; 709/250; 712/18; 710/56
[58] Field of Search .................................... 395/859, 853, 395/872, 876, 553, 800.18, 800.2, 800.25, 800.27, 200.62, 200.8, 200.67

[56] References Cited

U.S. PATENT DOCUMENTS

| | | | |
|---|---|---|---|
| 4,494,194 | 1/1985 | Harris et al. | 395/866 |
| 4,748,617 | 5/1988 | Drewlo | 370/446 |
| 5,014,187 | 5/1991 | Debize et al. | 395/886 |
| 5,047,917 | 9/1991 | Athas et al. | 395/500 |
| 5,208,914 | 5/1993 | Wilson et al. | 395/859 |
| 5,404,562 | 4/1995 | Heller et al. | 395/800.18 |
| 5,444,860 | 8/1995 | Datwyler et al. | 395/872 |
| 5,488,723 | 1/1996 | Baradel et al. | 395/683 |
| 5,764,641 | 6/1998 | Lin | 370/412 |

OTHER PUBLICATIONS

"Two–Level DMA from Channels to Main Store", IBM Technical Disclosure Bulletin, vol. 32, No. 12, May 1990.

"Method for Handling Disabled Memory Blocks with Simulated Failures", IBM Technical Disclosure Bulletin, vol. 38, No. 09, Sep. 1995.

"Data Rate Matching Buffer", IBM Technical Disclosure Bulletin, vol. 29, No. 4, Sep. 1986.

"Asynchronous/Queued I/O Processor Architecture", IBM Technical Disclosure Bulletin, vol. 36, No. 1 Jan. 1993.

*Primary Examiner*—Dung C. Dinh
*Attorney, Agent, or Firm*—Heslin & Rothenberg, P.C

[57] ABSTRACT

A message-passing protocol for accommodating early arrival messages passed between source and destination nodes in a computer system with a plurality of asynchronous computing nodes interconnected by bidirectional asynchronous communications channels. The protocol includes transmitting the message from sender to receiver without waiting for a request for the message from the receiver; determining at the receiver if a receive buffer has been posted for the message; and if the receive buffer has not been posted for the message, then either truncating the message by storing its message header in an early arrival queue at the receiver and discarding its data or allocating a temporary receive buffer at the receiver to hold the message data. Upon the receiver being ready to post a receive buffer for an early arrival message, the receiver checks the early arrival queue for the corresponding message header, and if the message header is in the early arrival queue and the message data has been discarded, then the receiver sends a pull request to the sender to retransmit the message to the receiver.

19 Claims, 9 Drawing Sheets

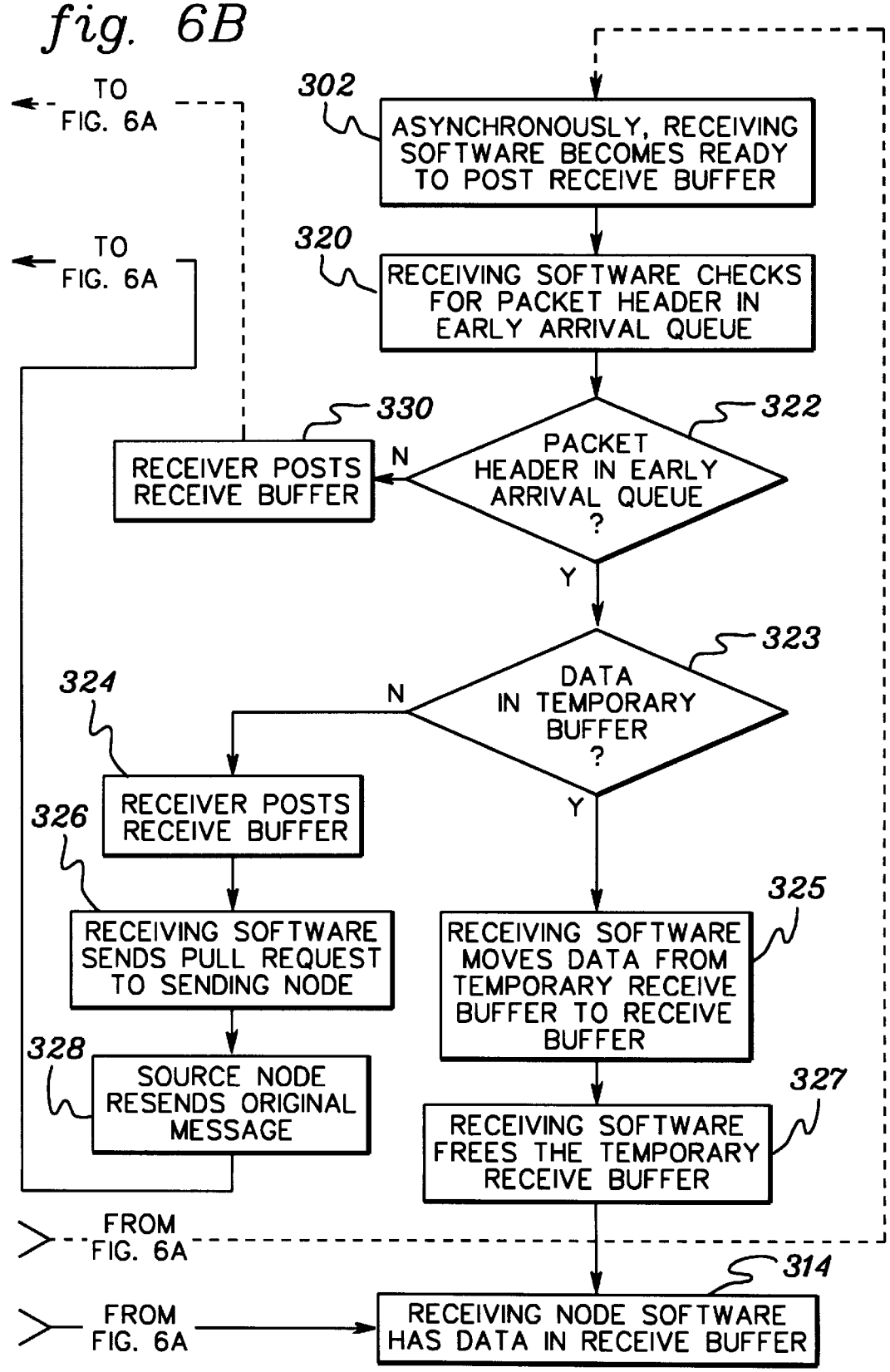

METHOD FOR PROCESSING EARLY ARRIVAL MESSAGES WITHIN A MULTINODE ASYNCHRONOUS DATA COMMUNICATIONS SYSTEM

TECHNICAL FIELD

This invention relates to message-passing in a computer system with a plurality of asynchronous computing nodes interconnected by bidirectional asynchronous communications channels, and in particular, to a method and system for accommodating early arrival messages within such a computer system to reduce message-passing latency between source and destination nodes.

BACKGROUND OF THE INVENTION

In parallel computers which use message-passing for processor interaction, user code on a source processor specifies a message to be sent, and user code on a destination processor specifies a location for the message to be received into. The operation of specifying where a received message is to be stored is termed "posting a buffer." Unless a buffer is posted, the communication system, which operates as a combination of hardware and software, cannot receive the message since there is no information on where to store the message data.

Because the source and destination processors are assumed to operate asynchronously, the source processor user command to send a message may be executed before the destination processor user command has occurred to post the corresponding buffer. Under normal operation, a message may thus arrive at a destination processor's hardware adapter for the communication system before a buffer has been posted for it.

Previous protocols have handled this problem by having the source processor store the message locally and not send it. When the destination processor user code posts a buffer, the communication system sends a "pull" message to the source processor telling it to send the message to the destination processor, where it can be received. This solution suffers from bad latency performance, however, since every message sent requires two transmission times, i.e., from the destination to the source for the "pull" and from the source to the destination for the message. The protocol can even require three transmission times since the source may send a message header, notifying the destination processor that it can now send a "pull".

Thus, there is a recognized need in the art for an improved message handling protocol to reduce latency between source and receiver nodes in a computer system with a plurality of asynchronous computer nodes interconnected by bidirectional asynchronous communications channels. The present invention addresses this need, and in particular, presents a protocol for handling early arrival messages, i.e., messages that arrive at a receiving node before the receive buffers have been posted for the messages.

DISCLOSURE OF THE INVENTION

Briefly summarized, the invention comprises in one aspect a method for processing a message transmitted from a source computing node (sender) to a receiver computing node (receiver) in a computer system with a plurality of computing nodes interconnected by bidirectional asynchronous communication channels for the transmission of messages between user process programs executing asynchronously in ones of the computing nodes. The message comprises a message header and data. The method includes: transmitting the message from the sender to the receiver without waiting for a request for the message from the receiver; determining at the receiver if a receive buffer has been posted for the message; if the receive buffer has not been posted for the message, then truncating the message by storing its message header in an early arrival queue at the receiver and discarding its data. Upon the receiver being ready to post a receive buffer for the message, the method further includes: checking the early arrival queue for the message header; and if the message header is in the early arrival queue, then sending a pull request from the receiver to the sender. The pull request instructs the sender to retransmit the message to the receiver.

In another aspect, the invention comprises an alternate method for communicating a message from a sender computing node (sender) to a receiver computing node (receiver) in a computer system with a plurality of computing nodes interconnected by bidirectional asynchronous communications channels for the transmission of messages between user programs executing asynchronously in ones of the computing nodes. The message again comprises a message header and message data. The method includes transmitting the message from the sender to the receiver without waiting for a message request from the receiver; upon receipt of the message at the receiver, determining whether a receive buffer has been posted for the message and if the receive buffer has been posted for the message, then storing the message in the receive buffer; and if the receive buffer has not been posted for the message, then allocating a temporary receive buffer at the receiver to hold the message data, and storing the message header and temporary buffer information in the early arrival queue at the receiver. Upon the receiver being ready to post a receive buffer for the message, the method further comprises: checking the early arrival queue for the corresponding message header; and if the message header is in the early arrival queue, then moving the message data from the temporary receive buffer to the receive buffer without requiring posting of the receive buffer.

In a further aspect, the invention comprises a computer system having a plurality of computing nodes interconnected by bidirectional asynchronous communications channels for the transmission of messages between user programs executing asynchronously in ones of the computing nodes. The computer system allows communicating of a message (comprising a message header and message data) from a sender computing node (sender) to a receiver computing node (receiver). The computer system includes means for transmitting the message from the sender to the receiver without waiting for a request for the message from the receiver. The receiver includes an early arrival queue and a packet receiver. The packet receiver determines if a receive buffer has been posted for the message upon its receipt, and if the receive buffer has not been posted for the message, the packet receiver also comprises means for truncating the message by storing its message header in the early arrival queue and discarding its message data. Upon the receiver being ready to post a receive buffer for the message, the system further includes means for checking the early arrival queue for a matching message header and means for sending a pull request from the receiver to the sender instructing the sender to retransmit the message to the receiver if the matching message header is in the early arrival queue.

In still another aspect, the invention comprises a computer system having a plurality of computing nodes interconnected by bidirectional asynchronous communications channels for the transmission of messages between user programs executing asynchronously in ones of the computer nodes. The computer system allows communicating of a message (comprising a message header and message data) from a sender computing node (sender) to a receiver computing node (receiver). The computer system includes means for transmitting the message from the sender to the receiver without waiting for a message request from the receiver. A communications adapter at the receiver includes a packet receiver for determining whether a receive buffer has been posted for the message upon its receipt, and if the receive buffer has been posted for the message, for copying the message into the receive buffer. If the receive buffer has not been posted for the message and temporary buffer space is available, the communications adapter further comprises means for allocating a temporary receive buffer at the receiver to hold the message data and for storing the message header and temporary buffer information in an early arrival queue at the receiver. Upon the receiver being ready to post a receive buffer for the message, the computer system further includes means for checking the early arrival queue for the matching message header, and if present, means for moving the message data from the temporary receive buffer to the receive buffer without requiring posting of the receive buffer at the communications adapter.

Other embodiments and aspects of the invention are also described in detail herein and are considered part of the claimed invention. For example, computer readable program code means encompassing the above-summarize methods are described and claimed. Additionally, numerous enhancements are presented for each aspect of the invention.

Described herein is an approach for accommodating early arrival messages to reduce message-passing latency between source and destination nodes within a computer system comprising a plurality of asynchronous computing nodes. The approach is to send a message without waiting for the receiver to request the message. Therefore, if the receive buffer has been posted, the message can be received immediately, incurring the latency of only a single transmission. If the message comprises an early arrival message, the method/system presented provides the flexibility to optimize performance by either dropping the data of the unexpected message or holding the data at the communication adapter level and notifying the receiver's processor accordingly. Both options uses the same underlying mechanism, i.e, runting, at the hardware level, and the communication system can decide at the software level which option to use in a current environment for best performance. Both options preserve the good message-passing performance possible when receive buffers have been previously posted.

BRIEF DESCRIPTION OF THE DRAWINGS

These and other objects, advantages and features of the present invention will be more readily understood from the following detailed description of certain preferred embodiments of the invention, when considered in conjunction with the accompanying drawings in which:

FIGS. 6a & 6b are a flowchart of a further embodiment of message-passing protocol in accordance with the present invention.

BEST MODE FOR CARRYING OUT THE INVENTION

Figure 1:
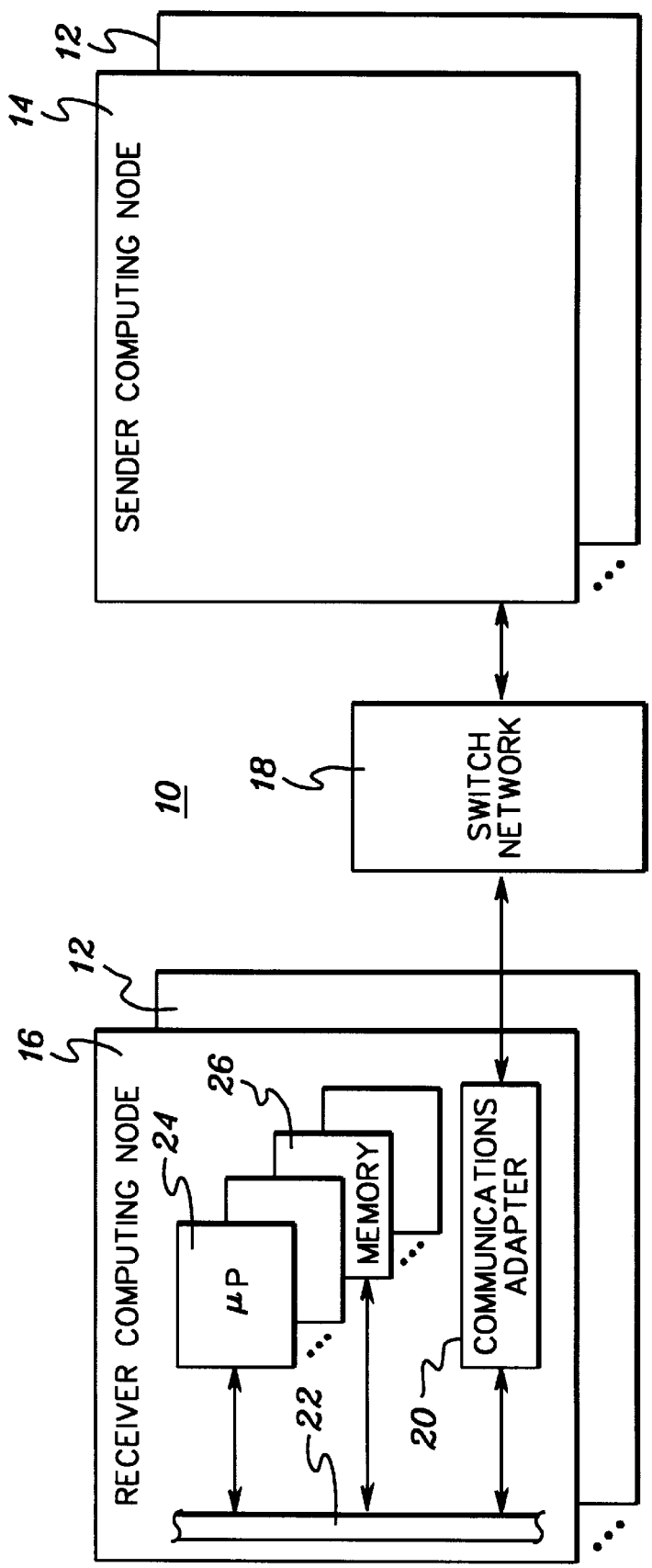
FIG. 1 is a diagram of one embodiment of a computer system to employ the present invention.

FIG. 1 depicts one embodiment of a computer system, generally denoted 10, to employ message-passing in accordance with the present invention. System 10 includes a plurality of computing nodes or processors 12, one of which is designated a message sender computing node (sender) 14, and a second of which comprises a message receiver computing node (receiver) 16. Nodes 12 comprise independent computers having their own operating systems processing user programs asynchronously. The nodes are tied together through a switch network 18, which may contain a number of switch chips. The switch chips are cross-bar, packet switching chips, interconnected to form a multi-stage interconnection network as is known in the art.

Contained within a compute node, such as receiver 16, are a communications adapter 20, a high speed system bus 22, one or more microprocessors 24, and one or more main storage memories 26. Message handling protocol in accordance with this invention is implemented within and between the sender's and the receiver's communications adapters 20.

Because the independent operating systems of computing nodes 12 are operating asynchronously, a handshaking mechanisms is conventionally employed in the transfer of a message from sender 14 to receiver 16. For example, before a message can be transferred from the sender to the receiver, the sender conventionally inquires whether the receiver is ready for the message. In such an implementation, three network crossings are necessarily employed to achieve message passing from the sender to the receiver.

In accordance with this invention, performance is improved by allowing messages to be sent within the system without a preliminary handshaking between sender and receiver to ensure that a receive buffer has been allocated for the message. This is possible through the provision of "early arrival support" at the receiving node. Early arrival support means there is capability at the receiver to efficiently handle an "early arrival" message, i.e., a message received before its corresponding buffer in the system has been allocated. As explained further below, the present invention provides the flexibility to optimize performance either by dropping a portion of an early arrival message or by holding the message at the communications adapter 20 level and notifying the processor accordingly. Pursuant to the invention, both options employ the same underlying mechanism at the hardware level and the communications system can decide at the software level which option to use in a current environment for best performance.

Figure 2:
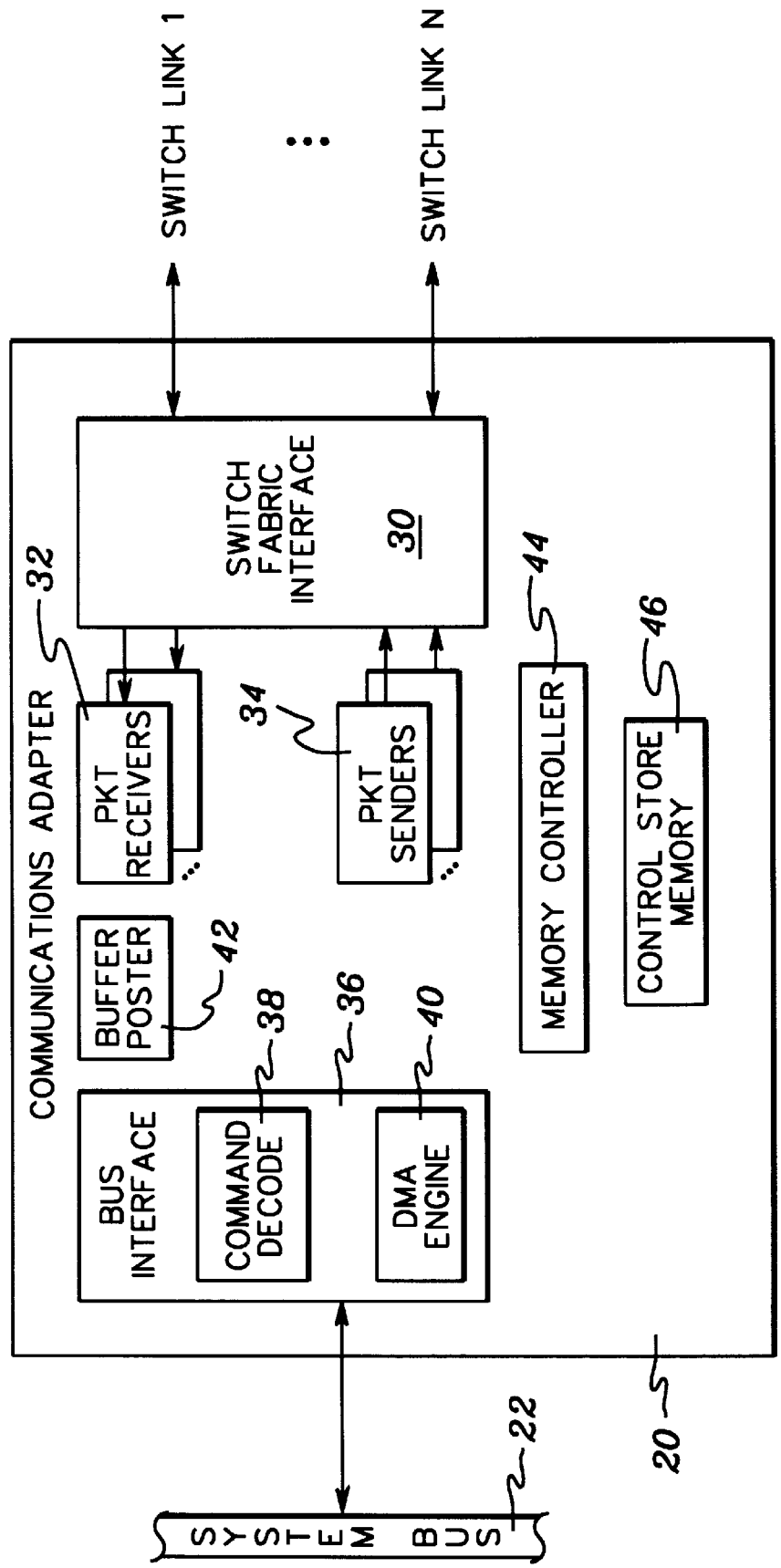
FIG. 2 is a diagram of one embodiment of the communications adapter of FIG. 1.

With reference to FIG. 2, the receiving node, under control of an application program, allocates a section of system memory for a particular message to be received from another computing node in the system. This receive buffer is "posted" when a command is given to the communications adapter to tell the adapter where to store the message once received. A buffer poster 42 within communications adapter 20 stores the descriptor information about the allocated receive buffer into a control store memory 46 via a memory controller 44. This descriptor information is stored in memory 46 until the corresponding message arrives. These descriptors in essence comprise pointers to the real receive buffers which have been posted in main system memory 26 (FIG. 1).

Communications adapter 20 further includes a switch fabric interface 30 which contains ports that physically connect to switch link 1 . . . switch link N, coupling the computing node to the switch network. A packet receiver 32 and packet sender 34 are provided for each physical connection to the packet switch 18 network (FIG. 1).

Communications adapter 20 communicates with the computing node's processor via system bus 22. A bus interface 36 couples adapter 20 to bus 22. The bus interface portion of the chip implements the bus protocol, receiving load/store commands for the processors. This portion also contains command decode logic 38, which watches for processor initiated functions and reacts accordingly, and a direct memory access (DMA) engine 40, which initiates bus operations. For example, engine 40 is capable of writing or reading data to system memory from the adapter without involving a host processor. Records for tracking and managing communications operations between bus interface 36 and switch fabric interface 30 are maintained in control store memory 46, which in one implementation may comprise multiple SRAM modules.

Figure 3:
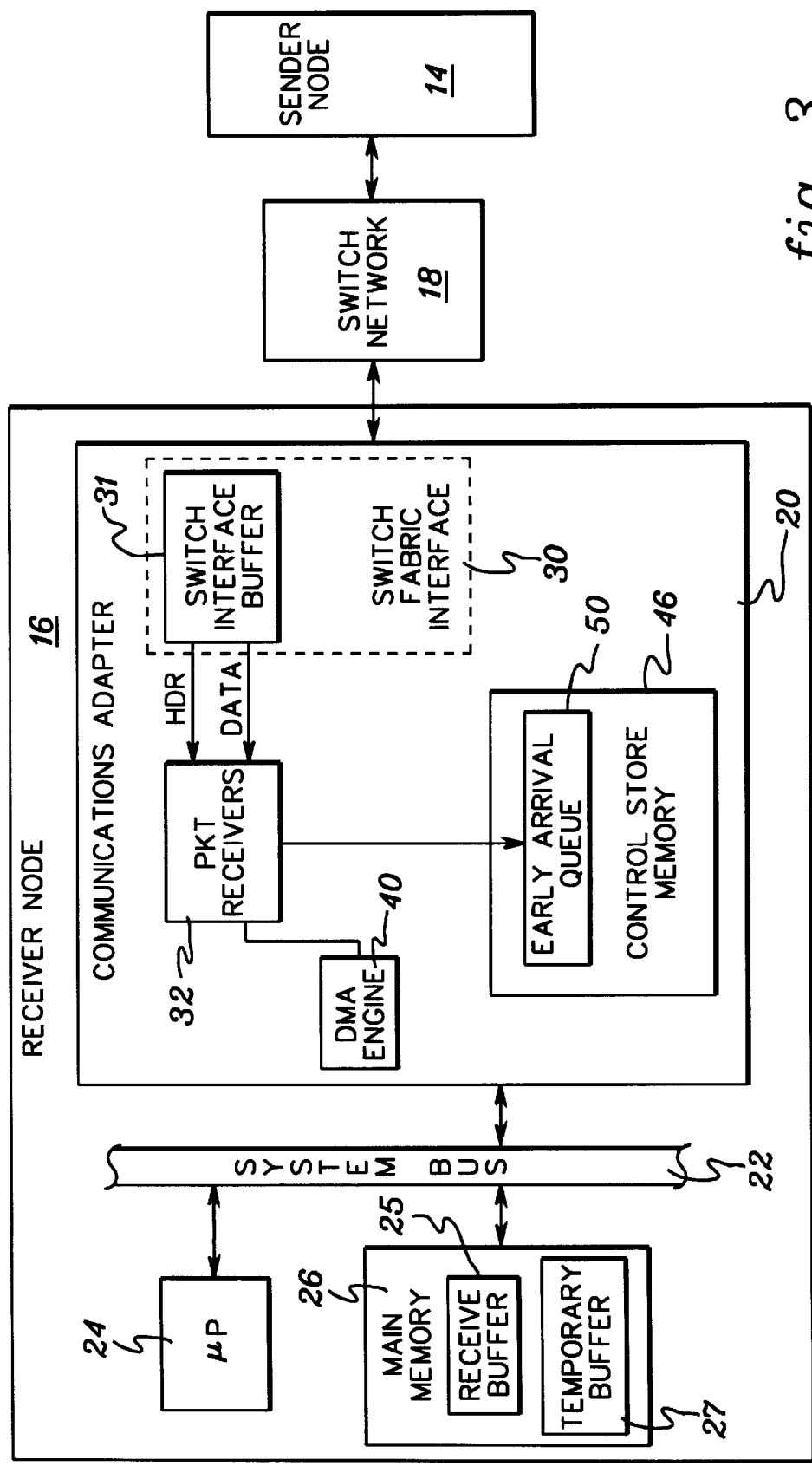
FIG. 3 is a diagram of a more detailed embodiment of the receiver node of FIG. 1 in accordance with the present invention.

FIG. 3 depicts in more specific detail flow control at receiver 16 in accordance with the present invention. A message received across switch network 18 from sender 14 is initially temporarily buffered in switch interface buffer 31 within switch fabric interface 30. Interface 30 distinguishes the header "HDR" and "DATA" portions of the message for packet receiver 32. Packet receiver 32 checks the data structures in control store memory 46 to see whether a receive buffer 25 for the message has been posted in main system memory. If the receive buffer 25 has been posted, then the message is copied via DMA engine 40 into main memory 26 across system bus 22.

If the corresponding receive buffer has yet to be posted for the message, then in accordance with the present invention, a "runt" is created by stripping the data from the received network message. Normally, a network message or packet contains three parts: a hardware header, which is interpreted by the adapter hardware, a software header, which is interpreted by software running on the microprocessor, and the packet data, which contains the actual message data. The headers contain information describing the data. For example, where the data came from, how many bytes of data are in the message, which message the message comes after, what type of data is contained in the message, etc.

A "runt" is a data structure to be stored in the adapter which contains the hardware and software headers, collectively referred to herein as a "message header". The message header contains information describing what conditions caused the message to be created, but includes no message data. In accordance with this invention, data structures comprising the "runt" are created by packet receiver 32 and placed in an early arrival queue 50 within control store memory 46. In addition, the "runt" is passed from the adapter to the software running on the microprocessor to inform the microprocessor software that a message has arrived which could not be received. The hardware adapter notifies the processor that the runt has been stored, either by writing a specific location in processor memory or by issuing a processor interrupt.

As noted briefly above, the communications adapter can implement different protocols in accordance with the present invention. For example, the adapter can discard the message data and go on to receiving subsequent messages, or the adapter can hold the message data in a temporary buffer 27 in main memory and wait for the processor to post a receive buffer for the message. In the first case, the processor will keep track of the "runt" or message header information, and will issue a "pull" request for the message when a matching receive buffer is posted by the user process program. The message will then be retransmitted from sender to receiver and copied into the posted receive buffer. In the second case, the communications system software will post a buffer for the message to be received into. Since the user code has not posted a receive buffer for the message, this buffer posted by the communications system software comprises a temporary buffer (27) where the data is temporarily stored until the user code to begin posting the corresponding receive buffer is executed.

In certain situations, the first option (discard data) is optimal since is does not make the adapter wait for a temporary buffer to be posted and allows the adapter to go on to receive other messages. However, it may decrease performance in other situations since messages have to be retransmitted. Thus in some situations, placement of the message data into a temporary buffer is optimal since it does not require the message to be retransmitted after a buffer has been posted. However, it may block the receiver from handling other messages which could be received.

The hardware adapter is programmable to allow either option to be employed. This lets the software layers operating at the communication system level on the destination processor to specify which operation is to be used in what situations and program the adapter accordingly. The hardware adapter also has a programmable timer, which may allow it to begin using the temporary buffer protocol, but switch to the data discard protocol should the communication system software take too long to post a matching receive buffer.

Various embodiments of message-passing in accordance with the present invention are depicted in FIGS. 4a–6b, and described below.

Figure 4A:
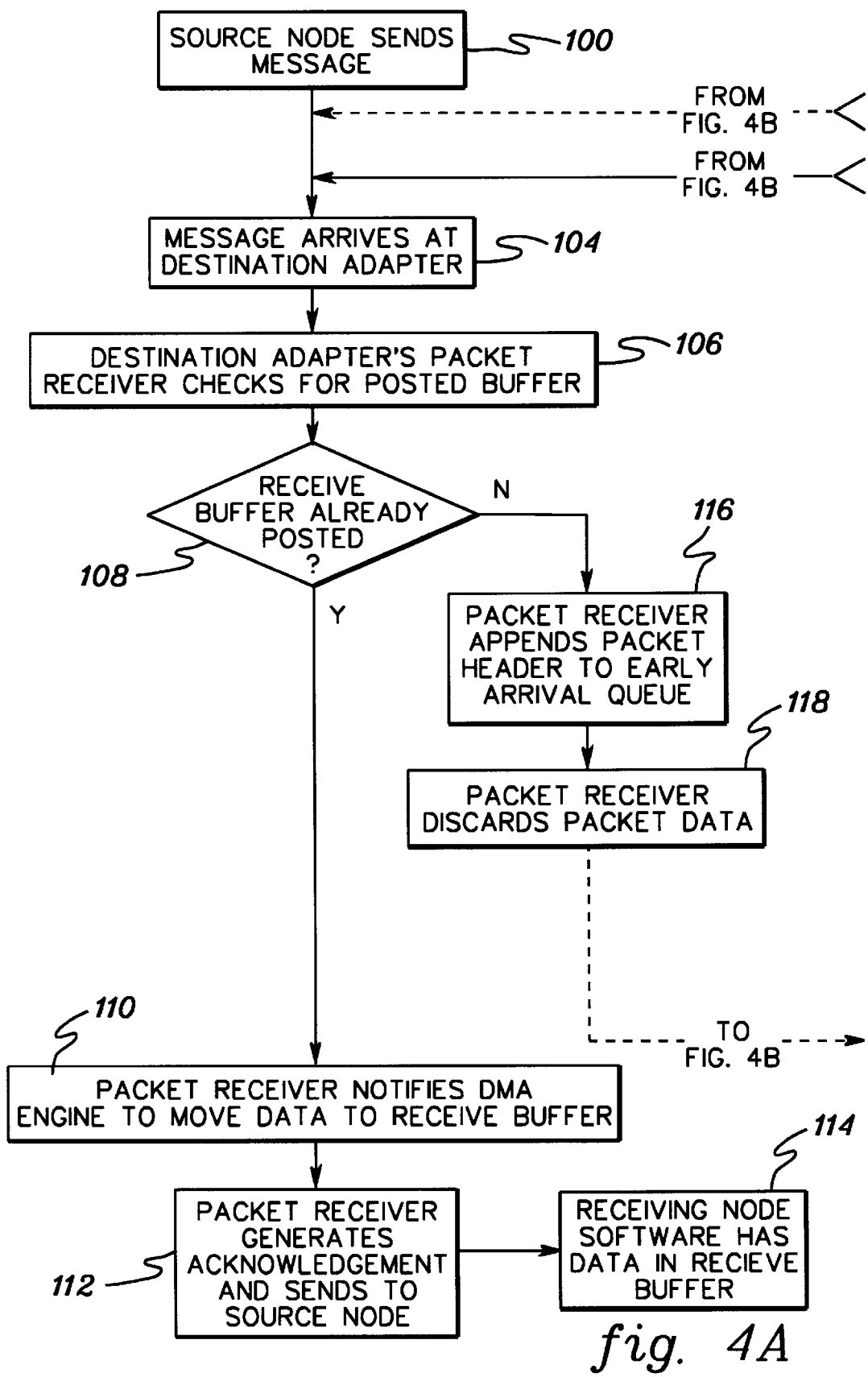
FIGS. 4a & 4b are a flowchart of one embodiment of a message-passing protocol in accordance with the present invention.
Figure 4B:
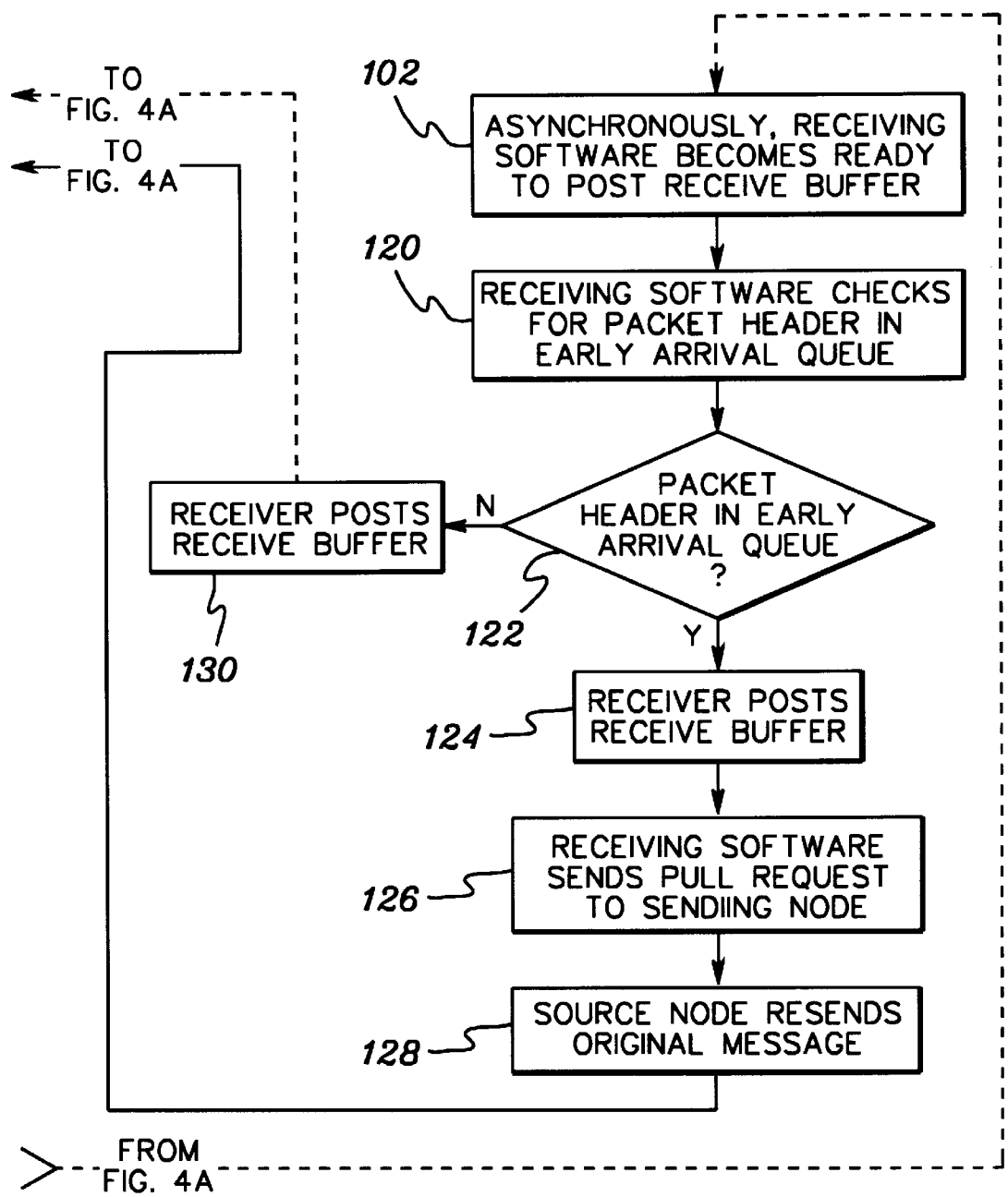

FIGS. 4a & 4b depict one message processing protocol employing runting and message data dropping in accordance with the present invention. This protocol is entered upon either the source node sending a message 100 to a destination node or the destination node asynchronously posting a receive buffer for the message 102. Beginning with the sender sending a message to the receiver (100), the message is received at the communications adapter of the receiving compute node 104. The adapter's packet receiver then reads the data structures in the control store memory to determine whether a receive buffer has already been posted (allocated) for this message 106. If the receive buffer is already posted 108, the protocol directs the packet receiver to notify the DMA engine in the bus interface to move the message to the posted receive buffer 110. The packet receiver then generates and sends an acknowledgement to the source node that the message has been received 112. Once placed within the posted receive buffer, the receiving node's user software has the message for further processing 114.

Returning to inquiry 108, if an unexpected message has been received at the destination node, i.e., a receive buffer has not been posted for the message, the packet receiver creates a "runt" for this message by storing the message header into the early arrival queue structure in the control store memory of the communications adapter 116. The packet receiver then discards the message data 118, and proceeds to process a next message received, or awaits the receiving software becoming ready to post the receive buffer (phantom line to FIG. 4b).

At some later time, the user processing program becomes ready to post the receive buffer 102 for what might have been an early arrival message. The receiving software initially checks for a corresponding message header in the early arrival queue 120. If the message header is not in the early arrival queue 122, then the receiver posts the receive buffer for the message 130. Alternatively, if the message was an early arrival message, and the packet header is in the early arrival queue, then the receiver posts the receive buffer 124 and sends a pull request to the source node to resend the message 126. The sender then resends the original message 128, and the receiver loops back to the message processing protocol beginning with message arrives at destination adapter 104.

Figure 5A:
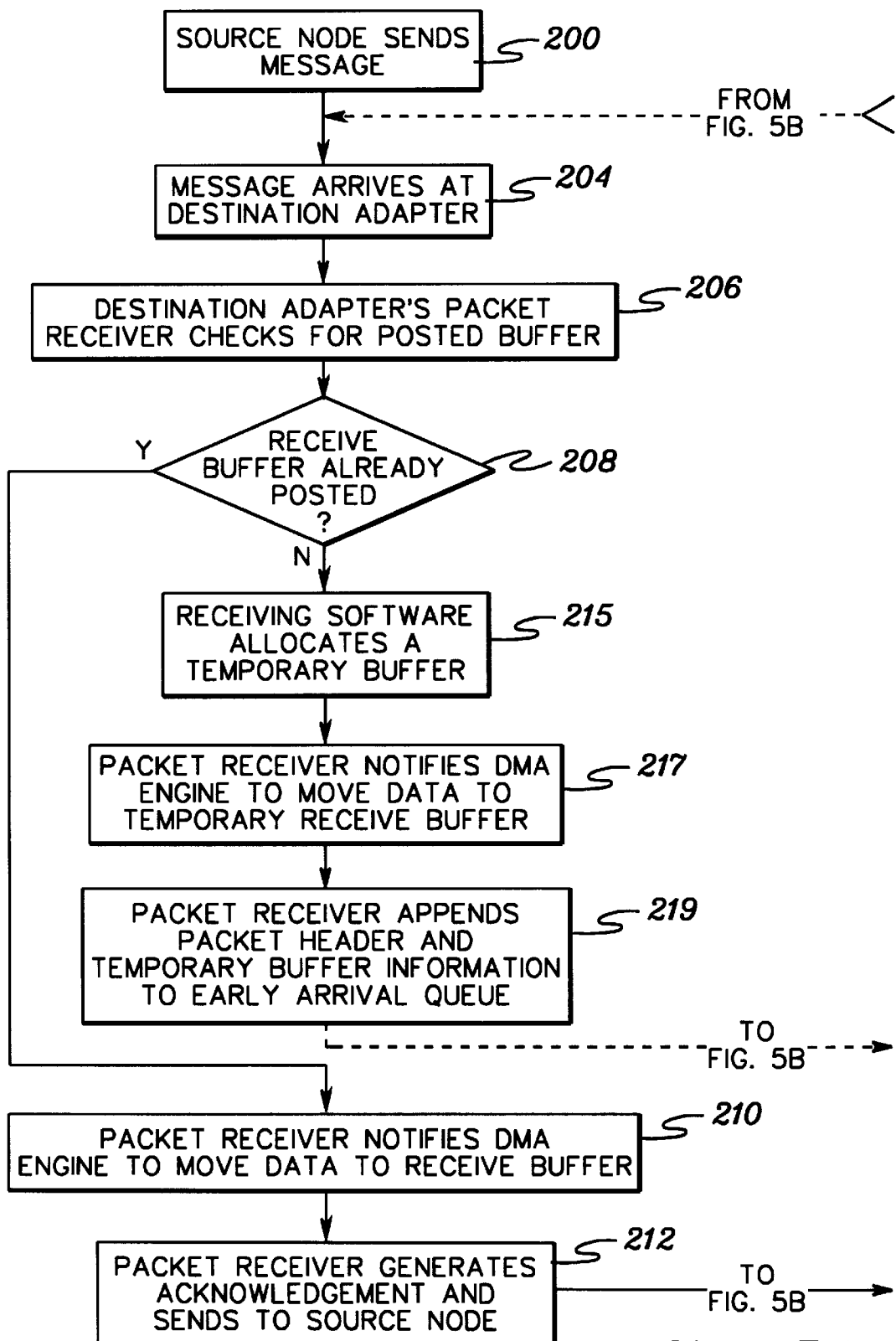
FIGS. 5a & 5b are a flowchart of another embodiment of a message-passing protocol in accordance with the present invention.
Figure 5B:
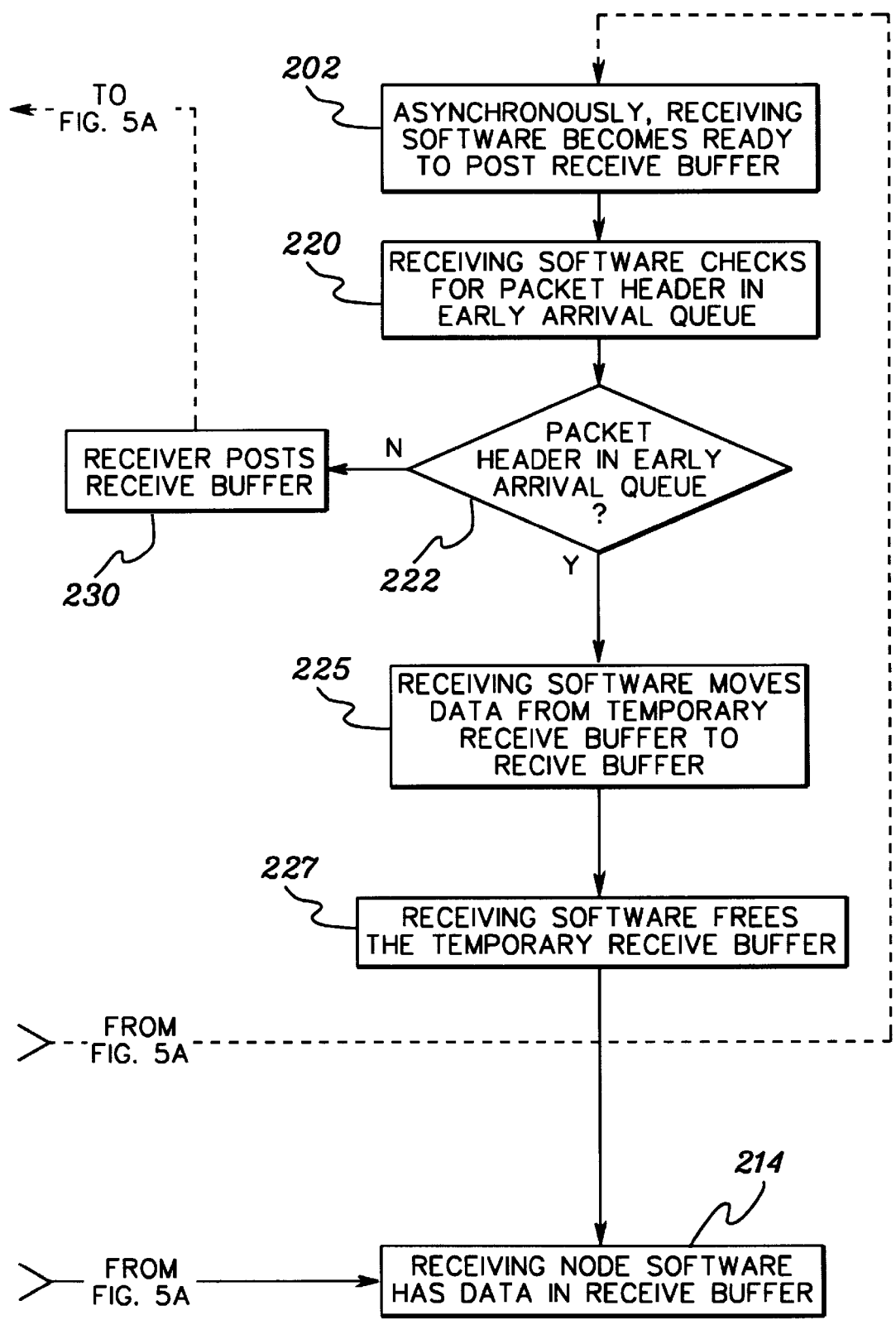

FIGS. 5 & 5b presents an alternate message processing protocol embodiment in accordance with the present invention wherein a temporary buffer is allocated by the adapter to accommodate an early arrival message and the receiver waits for designation of a receive buffer for the message by the user process program. The flow of FIGS. 5a & 5b is entered upon the source node sending a message 200 or the receiver asynchronously, becoming ready to post a receive buffer 202. If the source node sends a message the message is received at the destination node's communications adapter 204. The destination adapter's packet receiver initially checks for a corresponding posted receive buffer 206. If the receive buffer has already been posted 208, the packet receiver notifies the DMA engine to move the data to the receive buffer 210. The packet receiver then generates an acknowledgement and sends the acknowledgement back to the source node that the message has been received 212. The receiving node software can then employ the message data stored in the receive buffer 214.

If the receive buffer has not already been posted, then in this embodiment the receiving adapter's software allocates a temporary buffer in main memory 215. The packet receiver notifies the DMA engine to move the message data to this temporary receive buffer 217, and appends the message header and information on the temporary buffer to the early arrival queue in the control store memory of the adapter 219. Thereafter, processing waits for the user software to become ready to post a receive buffer for the message 202.

Upon the user process program becoming ready to post a receive buffer for the message, the software initially checks for the corresponding (or matching) message header in the early arrival queue 220. If the matching packet header is not in the early arrival queue 222, then the receiver posts the receive buffer 230 for the message. As noted above, "posting a receive buffer" entails creating data structures within the communications adapter for directing the adapter where the receive buffer for the message to be received is located.

If a matching packet header is in the early arrival queue 222, then the receiving software identifies the location of the temporary receive buffer and moves the message data from the temporary receive buffer to the receive buffer 225. The temporary receive buffer is then freed 227, e.g., for receipt of a next early arrival message. Once the message is in the receive buffer, the receiving node software can use the data 214.

Figure 6A:
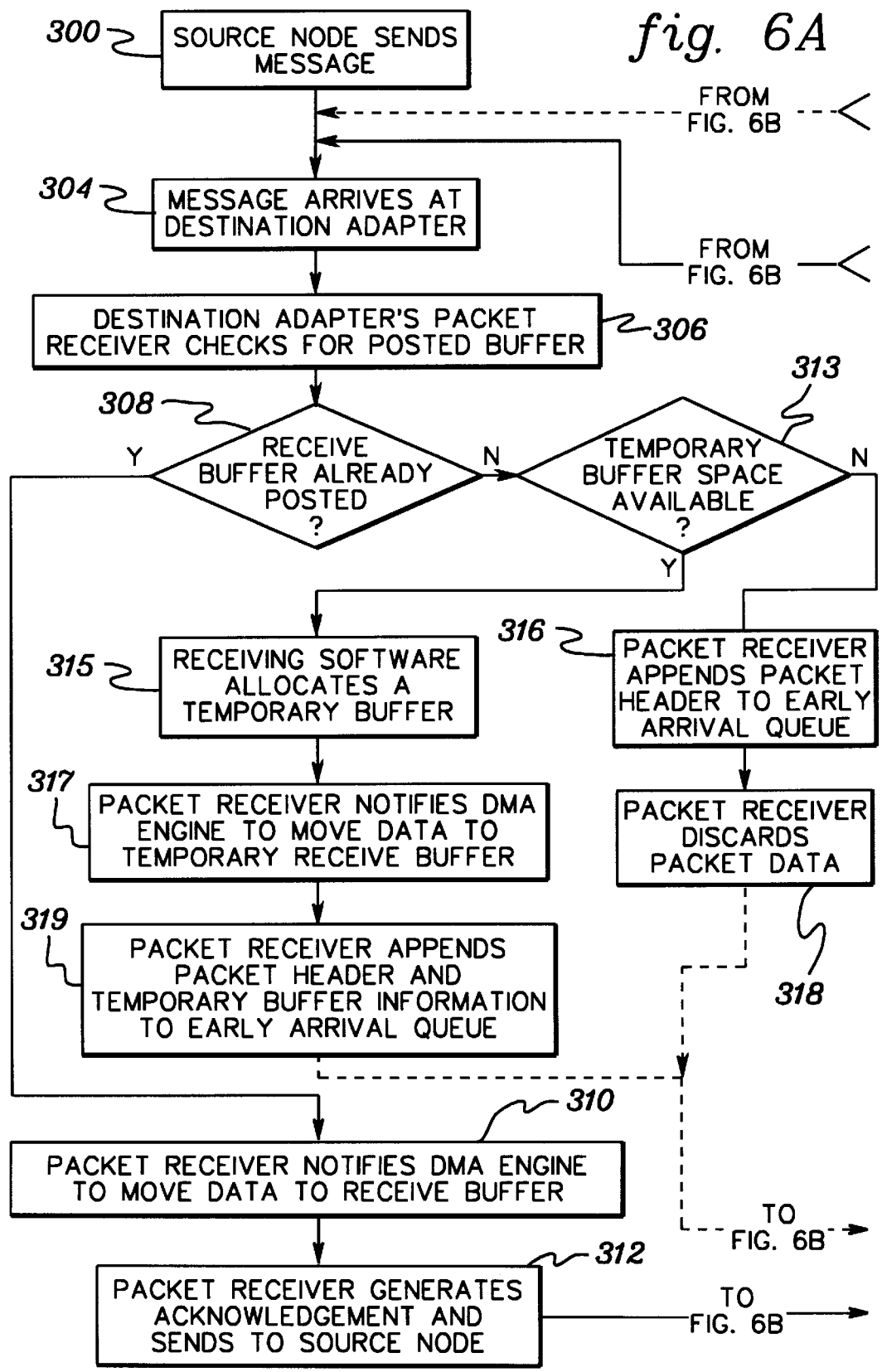

FIGS. 6a & 6b present a further message processing protocol in accordance with the present invention. In this processing flow, the methods of FIGS. 4a & 4b and 5a & 5b are combined. Processing again begins with either the source node sending a message 300 or the receiving node's software asynchronously becoming ready to post a receive buffer for a message 302.

Upon receipt of a message at a destination node 304, the destination adapter's packet receiver checks for a posted receive buffer corresponding to the message 306. If the receive buffer has already been posted 308, then the packet receiver notifies the DMA engine to move the data to the receive buffer 310 and generates an acknowledgement for transmission back to the source node 312. Once the data has been moved to the receive buffer, the receiving node's software can employ the message data 314.

If the receive buffer has not been posted for the message, then processing determines whether temporary buffer space is available in main memory 313. If available, then the receiving software allocates a temporary receive buffer 315 and the packet receiver notifies the DMA engine to move the message's data to the temporary receive buffer 317. The packet receiver also appends the packet header and temporary buffer location information to the early arrival queue 319. After storing the message, processing waits for the receiving software to become ready for the message 302.

If temporary buffer space is unavailable 313, then the packet receiver appends the packet header to the early arrival queue in the control store memory of the adapter 316, and discards the message data 318. Processing then waits for the receiving software to become ready to post the receive buffer for the early arrival message 302.

Upon the receiving software becoming ready to post a receive buffer for a message, the software checks for a matching packet header in the early arrival queue 320. If the packet header is not in the early arrival queue 322, then the receiver posts the receive buffer 330 for the message and waits for the source node to send the message.

If the packet header is in the early arrival queue 322, then processing determines whether the early arrival message has been held in a temporary receive buffer 323. If yes, then the receiving software moves the message data from the temporary receive buffer to the receive buffer 325 without requiring posting of the receive buffer since the message has already been received. Thereafter, the receiving software frees the temporary receive buffer 327 and the receiving node software can employ the message data located in the receive buffer 314. Alternatively, if the received early arrival message was not held in a temporary receive buffer, then the receiver posts the receive buffer 324 for the message and the receiving software sends a pull request to the sending node 326. The source node then resends the original message 328, which arrives at the destination node's adapter 304 and undergoes processing as described above.

Those skilled in the art will note from the above discussion that several approachs are presented herein for accommodating early arrival messages so as to reduce message-passing latency between source and destination nodes within a system comprising a plurality of asynchronous computing nodes. The protocol is to send a message without waiting for the receiver to request a message. If the receive buffer has been posted for the message, then the message is received immediately, incurring the latency of only a single transmission. If, on the other hand, the message comprises an early arrival message, then the approach presented herein provides flexibility to the communications system to optimize performance by either dropping the data of the unexpected message or holding the data at the communications adapter level and notifying the receiver's processor accordingly. Both options use the same underlying mechanism, i.e., runting, at the hardware level, and the communications system can decide at the software level which option to use in a current environment for best performance. Both options preserve the good message-passing performance possible when receive buffers have been previously posted.

The present invention can be included in an article of manufacture (e.g., one or more computer program products) having, for instance, computer usable media. The media has embodied therein, for instance, computer readable program code means for providing and facilitating the capabilities of the present invention. The articles manufactured can be included as part of a computer system or sold separately.

The flow diagrams depicted herein are provided by way of example. There may be variations to these diagrams or the steps or operations described herein without departing from the spirit of this invention. For instance, in certain cases the steps may be performed in differing order, or steps may be added, deleted or modified. All of these variations are considered to comprise part of the present invention as recited in the appended claims.

Although preferred embodiments have been depicted and described in detail herein it will be apparent to those skilled in the relevant art that various modifications, additions, substitutions and the like can be made without departing from the spirit of the invention and that these are therefore considered to be within the scope of the invention as defined in the following claims.

We claim:

1. In a computer system with a plurality of computing nodes interconnected by bidirectional asynchronous communications channels for the transmission of messages between user process programs executing asynchronously in ones of the computing nodes, a method for processing a message transmitted from a source computing node (sender) to a receiver computing node (receiver), said message comprising a message header and data, said method comprising:
   (a) transmitting the message from the sender to the receiver without waiting for a request for the message from the receiver;
   (b) determining at the receiver if a receive buffer has been posted for the message;
   (c) if the receive buffer has not been posted for the message, then:
      (i) truncating the message by storing its message header in an early arrival queue at the receiver and discarding its data;
      (ii) upon the receiver being ready to post a receive buffer for the message, checking the early arrival queue for the message header; and
      (iii) if the message header is in the early arrival queue, then sending a pull request from the receiver to the sender, said pull request instructing the sender to retransmit the message to the receiver.

2. The method of claim 1, further comprising storing the message in the receive buffer if said determining (b) determines that the receive buffer has been posted for the message.

3. The method of claim 2, further comprising subsequent to said storing of the message in the receive buffer, sending an acknowledgement from the receiver to the sender.

4. The method of claim 1, wherein if said checking (c)(ii) determines that the message header is not in the early arrival queue, then said method further comprises posting the receive buffer at the receiver and waiting for transmission of the message from the sender to the receiver without sending a request for the message.

5. The method of claim 1, wherein prior to said truncating (c)(i), said method further comprises:
   (d) if the receive buffer has not been posted for the message, then determining whether temporary buffer space is available for the message;
   (e) if temporary buffer space is available, then allocating a temporary buffer for the message, moving the data into the temporary buffer, and storing the message header and temporary buffer information in the early arrival queue at the receiver; and
   (f) performing said truncating (c)(i) only if temporary buffer space is unavailable for the message.

6. The method of claim 1, wherein said method comprises a method for processing multiple messages transmitted from one or more senders to the receiver, each message comprising a message header and data, said method comprising:
   transmitting the messages from the one or more senders to the receiver without waiting for requests for the messages from the receiver;
   for each message received at the receiver:
      determining if a receive buffer has been posted for the message,
      if a receive buffer has not been posted for the message, then truncating the message by storing its message header in the early arrival queue at the receiver and discarding its data;
   upon the receiver being ready to post a receive buffer for a desired message, checking the early arrival queue for a matching message header to the desired message; and
   if the matching message header is in the early arrival queue, then sending a pull request from the receiver to the sender of the desired message, said pull request instructing the sender to retransmit the desired message to the receiver.

7. The method of claim 1, wherein if the message header is not in the early arrival queue upon said checking (c)(ii), then waiting for the sender to transmit the message without sending a request for the message.

8. In a computer system with a plurality of computing nodes interconnected by bidirectional asynchronous communications channels for the transmission of messages between user process programs executing asynchronously in ones of the computing nodes, a method for passing a message from a source computing node (sender) to a receiver computer node (receiver), said message comprising a message header and data, said method comprising:
   (a) transmitting the message from the sender to the receiver without waiting for a request for the message from the receiver;
   (b) determining at the receiver if a receive buffer has been posted for the message and if the receive buffer has been posted for the message, then storing the message in the receive buffer; and
   (c) if the receive buffer has not been posted for the message, then truncating the message by storing its message header in an early arrival queue at the receiver and discarding its data.

9. In a computer system with a plurality of computing nodes interconnected by bidirectional asynchronous communications channels for the transmission of messages between user process programs executing asynchronously in ones of the computing nodes, a method for processing a message transmitted from a source computing node (sender) to a receiver computing node (receiver), said message comprising a message header and data, said method comprising:

upon the receiver being ready to post a receive buffer for the message, checking an early arrival queue for a corresponding message header, said message header being within said early arrival queue if said message comprises an early arrival message;

if the message header is in the early arrival queue, then sending a pull request from the receiver to the sender, said pull request instructing the sender to retransmit the message to the receiver; and posting the receive buffer at the receiver and waiting for retransmission of the message to the receiver.

10. In a computer system with a plurality of computing nodes interconnected by bidirectional asynchronous communications channels for the transmission of messages between user programs executing asynchronously in ones of the computing nodes, a method for communicating a message from a sender computing node (sender) to a receiver computing node (receiver), said message comprising a message header and message data, said method comprising:

(a) transmitting the message from the sender to the receiver without waiting for a message request from the receiver;

(b) upon receipt of the message at the receiver, determining whether a receive buffer has been posted for the message and if the receive buffer has been posted for the message, then storing the message in the receive buffer; and (c) if the receive buffer has not been posted for the message, then allocating a temporary receive buffer at the receiver to hold the message data, and storing the message header in an early arrival queue at the receiver.

11. The method of claim 10, further comprising:

upon the receiver being ready to post a receive buffer for the message, checking the early arrival queue for the message header; and if the message header is in the early arrival queue, then moving the message data from the temporary receive buffer to the receive buffer.

12. The method of claim 11, wherein said storing (c) further comprises storing location information for said temporary receive buffer with said message header in the early arrival queue.

13. The method of claim 11, wherein subsequent to said moving of the message data from the temporary receive buffer to the receive buffer, said method comprises freeing the temporary receive buffer.

14. The method of claim 11, further comprising transmitting an acknowledgement from the receiver to the sender upon storing of the message in the receive buffer.

15. The method of claim 11, further comprising prior to said allocating (c) determining whether temporary buffer space is available for the message, and wherein if temporary space is available, then performing said allocating (c), otherwise truncating the message by storing the message header in the early arrival queue at the receiver and discarding the message data.

16. The method of claim 15, further comprising sending a pull request from the receiver to the sender subsequent to said checking of the early arrival queue if the message header is in the early arrival queue but the message data has been discarded, said pull request instructing the sender to retransmit the message to the receiver.

17. The method of claim 15, wherein said moving is preceded by determining whether the message data is in the temporary receive buffer once the message header is found in the early arrival queue, and if present, proceeding with said moving of the message data from the temporary receive buffer to the receive buffer, otherwise sending said pull request from the receiver to the sender to retransmit the message.

18. The method of claim 16, further comprising posting the receive buffer subsequent to said checking if the message data is not in the temporary receive buffer.

19. The method of claim 10, wherein said method comprises a method for communicating multiple messages from one or more senders to the receiver, said method comprising transmitting the multiple messages from the one or more senders to the receiver without waiting for message requests from the receiver, and for each message received at the receiver, performing said steps (b) & (c), and upon the receiver being ready to post a receive buffer for a desired message, checking the early arrival queue for the message header matching the desired message, and if the matching message header is in the early arrival queue, then moving corresponding message data from the temporary receive buffer to the receive buffer for the desired message.

* * * * *